(12) United States Patent
Lim et al.

(10) Patent No.: US 9,173,235 B2
(45) Date of Patent: Oct. 27, 2015

(54) APPARATUS AND METHOD FOR SELF-SCHEDULING IN A WIRELESS COMMUNICATION SYSTEM

(75) Inventors: Se-Youn Lim, Seoul (KR); Tae-Jin Lee, Suwon-si (KR)

(73) Assignees: Samsung Electronics Co., Ltd., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 149 days.

(21) Appl. No.: 14/122,999

(22) PCT Filed: May 31, 2012

(86) PCT No.: PCT/KR2012/004311
§ 371 (c)(1),
(2), (4) Date: Nov. 27, 2013

(87) PCT Pub. No.: WO2012/165881
PCT Pub. Date: Dec. 6, 2012

(65) Prior Publication Data
US 2014/0098776 A1    Apr. 10, 2014

(30) Foreign Application Priority Data
May 31, 2011    (KR) .................. 10-2011-0052506

(51) Int. Cl.
*H04W 84/12* (2009.01)
*H04W 74/08* (2009.01)
(Continued)

(52) U.S. Cl.
CPC ....... *H04W 74/0816* (2013.01); *H04L 27/0006* (2013.01); *H04W 74/0808* (2013.01); *H04W 16/14* (2013.01); *Y02B 60/50* (2013.01)

(58) Field of Classification Search
USPC .......................... 370/338, 337, 348, 445, 347
See application file for complete search history.

(56) References Cited

U.S. PATENT DOCUMENTS

| 2005/0058151 A1* | 3/2005 | Yeh | 370/445 |
|---|---|---|---|
| 2008/0069040 A1* | 3/2008 | An | 370/329 |
| 2008/0144493 A1* | 6/2008 | Yeh | 370/230 |

(Continued)

FOREIGN PATENT DOCUMENTS

KR    10-2010-0106458 A    10/2010

OTHER PUBLICATIONS

Zhang, Xi et al., CREAM-MAC: Cognitive Radio-Enabled Multi-Channel MAC Protocol Over Dynamic Spectrum Access Networks, IEEE Journal of Selected Topics in Signal Processing, Feb. 2011, pp. 110-123, vol. 5.

(Continued)

*Primary Examiner* — Andrew Lee
(74) *Attorney, Agent, or Firm* — Jefferson IP Law, LLP

(57) ABSTRACT

The present disclosure provides channel sensing in an efficient manner in a cognitive radio MAC protocol and improves channel utilization. Proposed is an Adaptive Channel Sensing (ACS) for variably sensing a channel in accordance with a Fixed Channel Sensing (FCS) and a channel state so as to perform the channel sensing in an efficient manner while reducing the power consumption of a terminal. Further proposed is a self-scheduling mechanism which enables multiple terminals to simultaneously transceive data by means of a slot-based contention on the basis of the results of the FCS and ACS, which are proposed by the present disclosure.

15 Claims, 8 Drawing Sheets

(51) Int. Cl.
*H04L 27/00* (2006.01)
*H04W 16/14* (2009.01)

(56) References Cited

U.S. PATENT DOCUMENTS

| | | | |
|---|---|---|---|
| 2008/0232487 A1* | 9/2008 | Cleveland et al. | 375/260 |
| 2010/0093360 A1* | 4/2010 | Choi et al. | 455/450 |
| 2010/0128705 A1* | 5/2010 | Miyoshi | 370/338 |
| 2010/0232310 A1* | 9/2010 | Hu | 370/252 |
| 2010/0304772 A1 | 12/2010 | Wang et al. | |
| 2011/0142027 A1* | 6/2011 | Shi et al. | 370/345 |
| 2012/0108276 A1* | 5/2012 | Lang et al. | 455/501 |
| 2012/0128043 A1* | 5/2012 | Hong et al. | 375/219 |
| 2012/0195212 A1* | 8/2012 | Zhang et al. | 370/252 |
| 2012/0281643 A1* | 11/2012 | Sun et al. | 370/329 |
| 2013/0215839 A1* | 8/2013 | Heo et al. | 370/329 |

OTHER PUBLICATIONS

Su, Hang et al., Opportunistic MAC Protocols for Cognitive Radio Based Wireless Networks, pp. 363-368.

* cited by examiner

Algorithm 1 Proposed Self-Scheduling Multi-Channel Cognitive MAC (SMC-MAC) Protocol

```
1:  // N_ch : Number of licensed channels
2:  // Ch_max : Number of channels that an SU is able to sense
3:  // Ch_idle : Number of idle channels that an SU is allowed to use
4:  // M : Number of contention slots in a contention interval
5:  // Start of a new cycle
6:  // Sensing-Sharing (SS) interval
7:  Generate Ch_max distinct random channel numbers in [1, N_ch]
8:  Save them into chNum[·] array in an ascending order
9:  cnt = 1, sensing_flag = 1, count_idle = 0
10: for i = 1 to N_ch do
11:     if (i ==chNum[cnt]) && (sensing_flag == 1) then
12:         cnt++
13:         Sense the status of channel i
14:         if (selected channel status = IDLE) then
15:             count_idle + +
16:             Broadcast the channel status = 10 // Idle channel
17:         else if (selected channel status == BUSY) then
18:             Broadcast the channel status = 11 // Busy channel
19:         end if
20:         if Adaptive Channel Sensing (ACS) then
21:             if (count_idle == Ch_idle) then
22:                 sensing_flag = 0 // Stop sensing channels
23:             end if
24:         else if Fixed Channel Sensing (FCS) then
25:             Continue
26:         end if
27:     end if
28: end for
29: // Contention (CT) interval
30: ctNum = selected random contention-slot in [1,M]
31: ct_success_flag = 0
32: for j = 1 to M do
33:     if (j == ctNum) then
34:         Send a CR-RTS frame with the request for the desired sensed idle channels
35:         Receive a CR-CTS frame with the selected sensed idle channels
36:         if CR-CTS is received correctly then
37:             ct_success_flag = 1 // Success
38:         end if
39:     else
40:         Overhear other CR-RTSs/CR-CTSs//To know which
                channels are reserved by other users
41:     end if
42: end for
43: //Transmission interval
44: if (ct_success_flag == 1) then
45:     Transmit data frames using the reserved idle channels in CT interval
46: else
47:     Wait for the next cycle
48: end if
```

FIG.8

APPARATUS AND METHOD FOR SELF-SCHEDULING IN A WIRELESS COMMUNICATION SYSTEM

CROSS-REFERENCE TO RELATED APPLICATION(S)

This application is a National Stage application under 35 U.S.C. §371 of an International application filed on May 31, 2012 and assigned application No. PCT/KR2012/004311, and claims the benefit under 35 U.S.C. §365(b) of a Korean patent application filed on May 31, 2011 in the Korean Intellectual Property Office and assigned Serial No. 10-2011-0052506, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) RESEARCH & BUSINESS FOUNDATION SUNGKYUNKWAN UNIVERSITY.

TECHNICAL FIELD

The present disclosure relates to a Cognitive Radio (CR) wireless communication system. More particularly, the present disclosure relates to an apparatus and method for self-scheduling in a CR wireless communication system based on an ad-hoc network.

BACKGROUND

For co-existence between systems along with the rapid development of wireless communication technology, each wireless communication system should secure and maintain its own frequency band. However, as almost of all substantially available frequency bands have been allocated, the lack of frequency resources for a new wireless communication system has become a challenging issue. Accordingly, frequency bands ranging from a few Hz to hundreds of GHz are all occupied and thus little frequency remains for additional use.

To solve the lack of radio frequency resources, one technique under recent consideration is CR. It is difficult to allocate a new frequency to a new communication service under the current fixed frequency allocation policy due to limited spectrum resources. However, it has been revealed that the use rates of the current allocated frequencies are very low. In this context, dynamic and opportunistic spectrum access techniques have been studied.

FIG. 1 illustrates a CR communication system according to the related art.

Referring to FIG. 1, when a licensed Primary User (PU) does not use a channel, an unlicensed Secondary User (SU) may use the channel in the CR communication system. CR is based on Software Defined Radio (SDR). SDR enables a transceiver to tune to an intended spectrum band by changing a software parameter without any hardware modification. In an initial stage, a centralized CR system such as one conforming to Institute of Electrical and Electronics Engineers (IEEE) 802.22 was designed by SDR in a cellular network. A new CR system has also been developed for an ad-hoc network. A pair of terminals can transmit and receive data during one frame interval by a MAC protocol in a conventional CR system designed for an ad-hoc network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for efficiently sensing a channel and increasing channel utilization in a Cognitive Radio (CR) system for an ad-hoc network.

Another aspect of the present disclosure is to provide Fixed Channel Sensing (FCS) and Adaptive Channel Sensing (ACS), that is, variable channel sensing based on a channel state in order to reduce the power consumption of a terminal and efficiently sense a channel in a CR system for an ad-hoc network.

Another aspect of the present disclosure is to provide a self-scheduling mechanism that enables a plurality of terminals to transmit and receive data simultaneously by slotwise contention based on FCS and ACS channel sensing results.

In accordance with an aspect of the present disclosure, a self-scheduling method in a CR system is provided. The self-scheduling method includes transmitting data on different channels during the same transmission interval of one frame by one or more secondary users. The frame includes an idle interval, a sensing and sharing interval, a slotwise contention interval, and the transmission interval, and the number of channels is equal to the number of slots, and wherein, during the sensing and sharing interval, the secondary users sense channels of a primary user and share the sensed results.

In accordance with another aspect of the present disclosure, a self-scheduling apparatus in a CR system is provided. The self-scheduling apparatus includes a transmitter configured to enable one or more secondary users to transmit data on different channels during the same transmission interval of one frame. The frame includes an idle interval, a sensing and sharing interval in which secondary users sense channels of primary users and share sensed results, a slotwise contention interval, and the transmission interval, and the number of channels is equal to the number of slots, and wherein, during the sensing and sharing interval, the secondary users sense channels of a primary user and share the sensed results.

Because the number of sensed channels is determined according to the traffic load of a Primary User (PU), fewer channels are sensed for a lower traffic load and more channels are sensed for a higher traffic load.

One or more Secondary Users (SUs) can be scheduled such that they may transmit data on different channels.

Multiple channels can be efficiently transmitted and received by enabling a plurality of terminals to transmit signals and the power consumption of a terminal can be reduced through effective channel sensing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates a SMC-MAC protocol algorithm according to an embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A wireless communication system to which a self-scheduling method according to the present disclosure is applied is a Cognitive Radio (CR) system conforming to Institute of Electrical and Electronics Engineers (IEEE) 802.22. The CR system includes a plurality of radio nodes (i.e., terminals) that sense channels, transmit traffic, receive traffic, and switch channels, and a wireless Access Point (AP) communicating with the terminals.

Terms used herein are defined in Table 1.

TABLE 1

| Term | Definition |
|---|---|
| $N_{ch}$ | Number of licensed channels |
| $CH_{max}$ | Number of channels that can be sensed by one Secondary User (SU) |
| $CH_{idle}$ | Number of idle channels allowed for one SU |
| M | Number of contention slots in contention interval |

Figure 1:
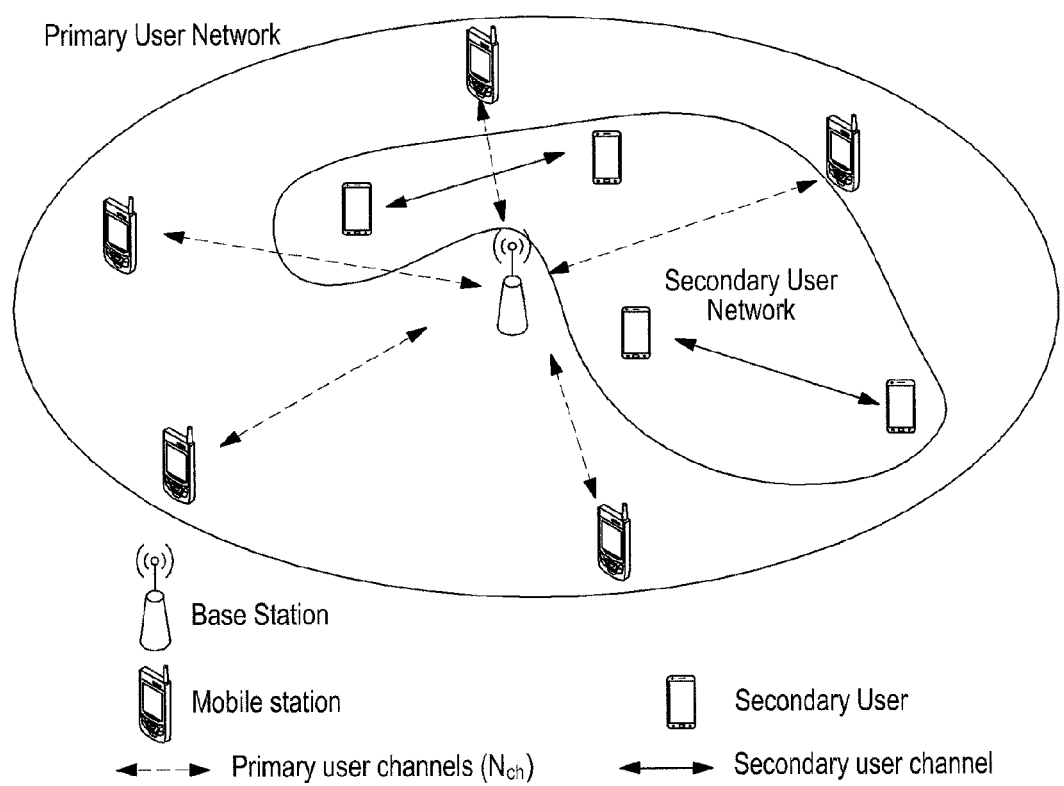
FIG. 1 illustrates the configuration of a Cognitive Radio (CR) system for an ad-hoc network according to the related art.
Figure 2:
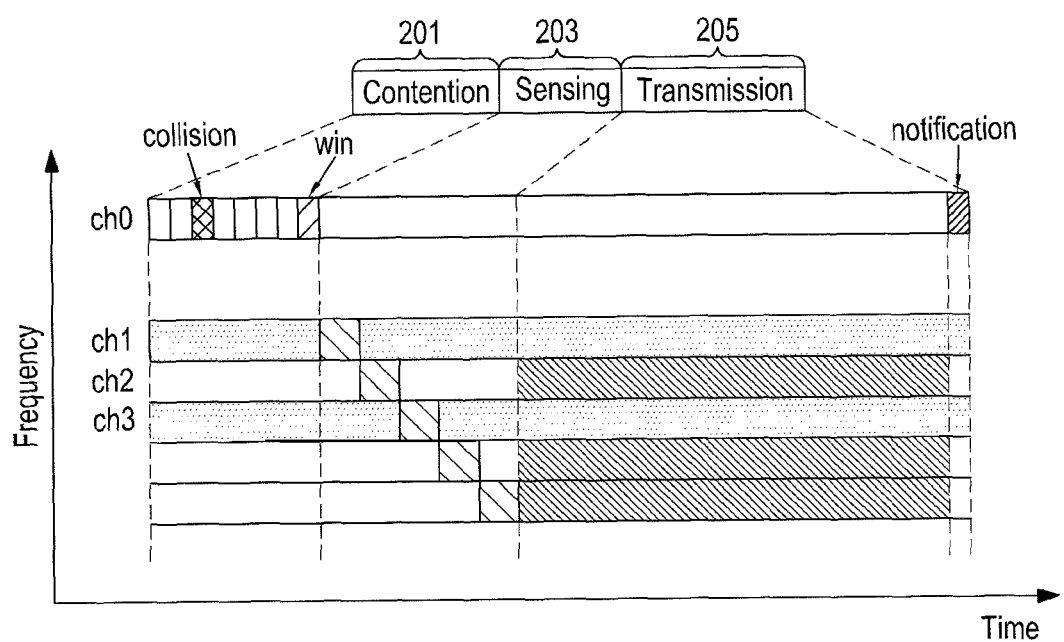
FIG. 2 illustrates a Hardware Constrained Medium Access Control (HC-MAC) protocol according to an embodiment of the present disclosure.

FIG. 2 illustrates a Hardware-constrained Cognitive-Medium Access Control (HC-MAC) protocol according to an embodiment of the present disclosure.

An HC-MAC frame includes a contention interval 201, a sensing interval 203, and a transmission interval 205. There is one control channel and N data channels. A transmission terminal is selected through contention among terminals that intend to transmit signals during the contention interval 201. The selected terminal detects an idle channel by sensing channel states during the sensing interval 203. The terminal transmits a signal on the idle channel during the transmission interval 205.

Figure 3:
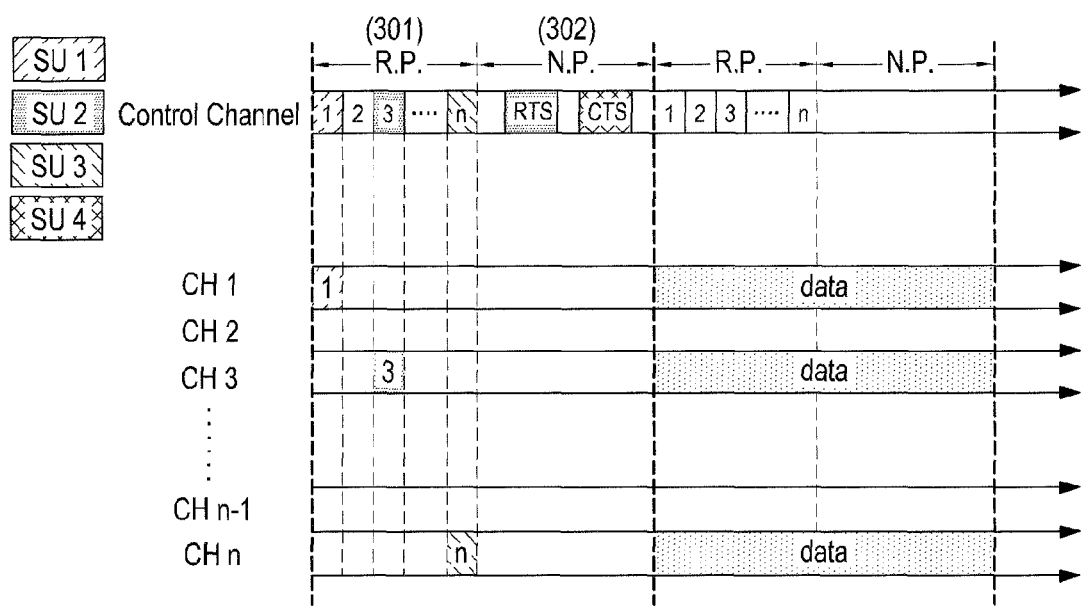
FIG. 3 illustrates an Opportunistic Media Access Control (MAC) protocol according to an embodiment of the present disclosure.

FIG. 3 illustrates an Opportunistic Media Access Control (MAC) protocol according to an embodiment of the present disclosure.

Referring to FIG. 3, an Opportunistic MAC frame includes a Report Phase (R.P.) interval 301 and a Negotiation Phase (N.P.) interval 302. There is one control channel and n data channels. The R.P. interval 301 includes n slots. The number of slots is equal to the number n of channels. Therefore, each terminal randomly selects one of the n channels and senses the state of the randomly selected channel in the n slots. When a sensed channel turns out to be in an idle state, the terminal contends with other terminals during the N.P. interval 302. The contention takes place in the control channel. If the terminal is successful in the contention, the terminal transmits a signal on a data channel in the next frame.

The conventional technologies generally face two problems.

One of the problems is channel sensing. A terminal succeeding in a contention senses all corresponding channels in HC-MAC. Accordingly, if n data channels exist, the terminal may find the states of all channels by n channel sensing operations. Since one terminal senses the n channels, the sensing consumes time and power. In Opportunistic MAC, a terminal selects one of n channels randomly and senses the selected channel, rather than all channels. During contention in the N.P. interval 302, other terminals obtain state information about non-sensed channels by overhearing a message of a terminal succeeding in the contention. Since only the message of the successful terminal can be overheard (i.e., unsuccessful terminal cannot be overheard), sensing based on terminal information received in a plurality of frames makes it difficult to reflect a fast changes of the channel state.

The other problem is described below.

The conventional protocols are advantageous in increased system throughput due to the use of multiple channels. Despite this advantage, conventional protocols are inefficient in terms of channel utilization because only a pair of terminals transmit and receive signals. If a terminal having much transmission data succeeds in a transmission contention and thus transmits the data, the multi-channel use efficiency is high. On the other hand, if the terminal succeeding in the transmission contention has a smaller amount of transmission data, the terminal may not use an entire channel despite acquisition of a transmission opportunity. As a result, the channel use efficiency is reduced.

The present disclosure is intended to increase channel sensing and channel utilization in a CR MAC protocol. For the purpose of power reduction and efficient channel sensing of a terminal, Fixed Channel Sensing (FCS) and Adaptive Channel Sensing (ACS), which is variable channel sensing based on a channel state, is disclosed. The present disclosure provides a self-scheduling mechanism that enables a plurality of terminals to transmit and receive data simultaneously through slotwise contention based on FCS and ACS channel sensing results.

Figure 4:
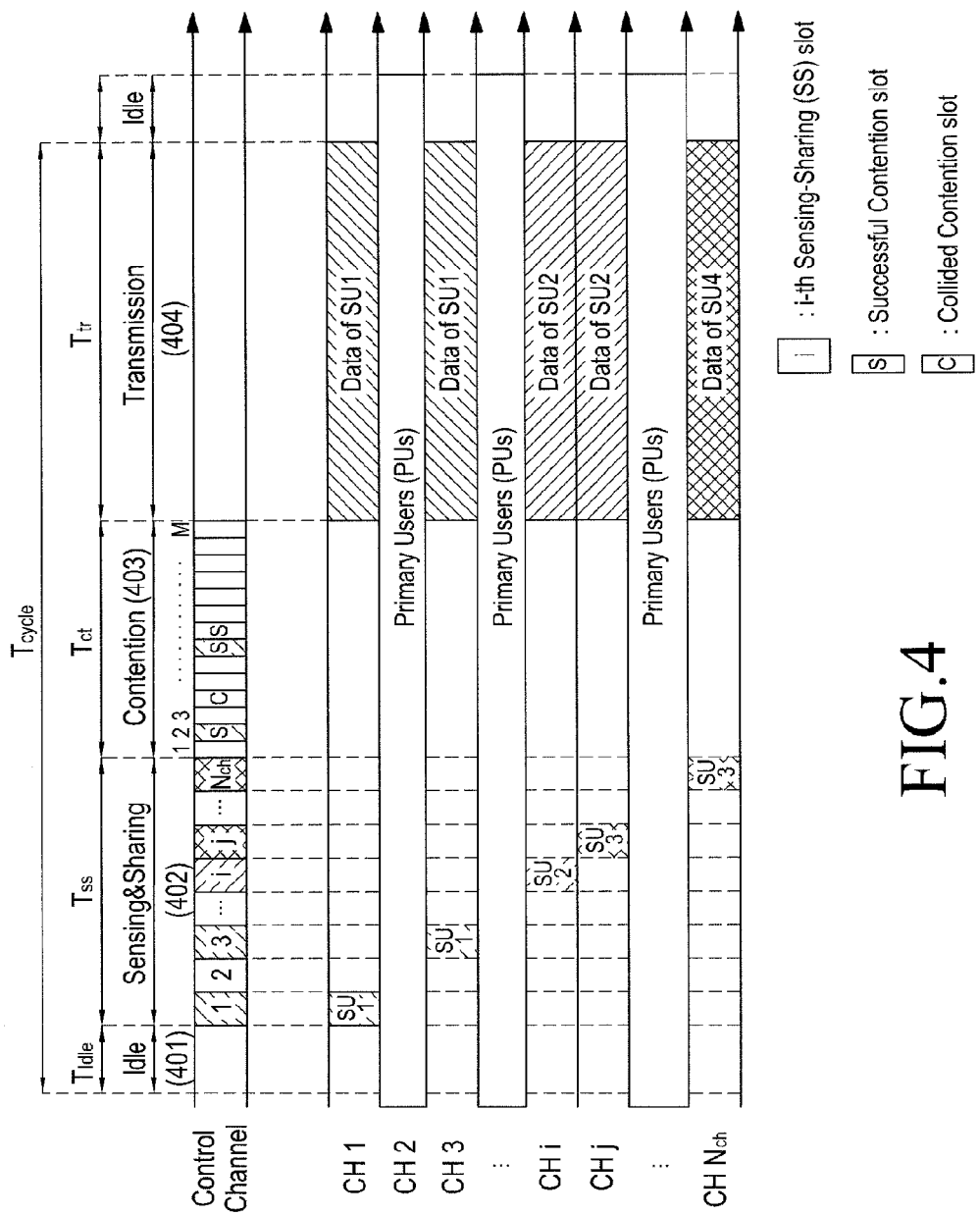
FIG. 4 illustrates a Self-scheduling Multi-channel Cognitive-MAC (SMC-MAC) protocol according to an embodiment of the present disclosure.

FIG. 4 illustrates a Self-scheduling Multi-channel Cognitive-MAC (SMC-MAC) protocol according to an embodiment of the present disclosure.

The SMC-MAC protocol according to the present disclosure is performed as follows.

SUs use one common control channel and N data channels. All SUs operate in cycled synchronization. One cycle includes four intervals that may be described as a CR-idle interval 401, a Sensing and Sharing (SS) interval 402, a contention interval 403, and a transmission interval 404. The CR-idle interval 401 is the start of a cycle.

Figure 5:
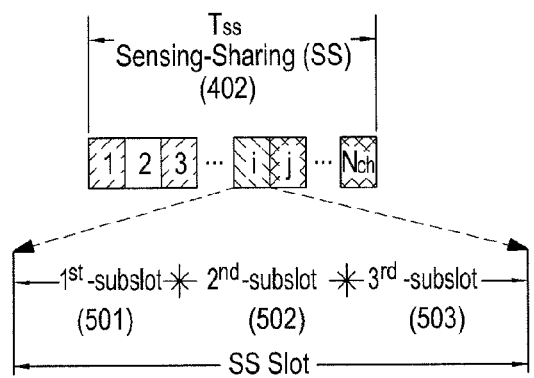
FIG. 5 illustrates a Sensing and Sharing (SS) interval according to an embodiment of the present disclosure.

FIG. 5 illustrates a Sensing and Sharing (SS) interval according to an embodiment of the present disclosure.

SUs sense Primary User (PU) channels and share sensed results during the SS interval. The SS interval includes as many slots as the number of channels. Therefore, given N channels, N slots are defined in the SS interval. Each slot is divided into three subslots. A terminal senses a channel in a first subslot 501 and broadcasts a sensed result to other terminals in second and third subslots 502 and 503.

Figure 6:
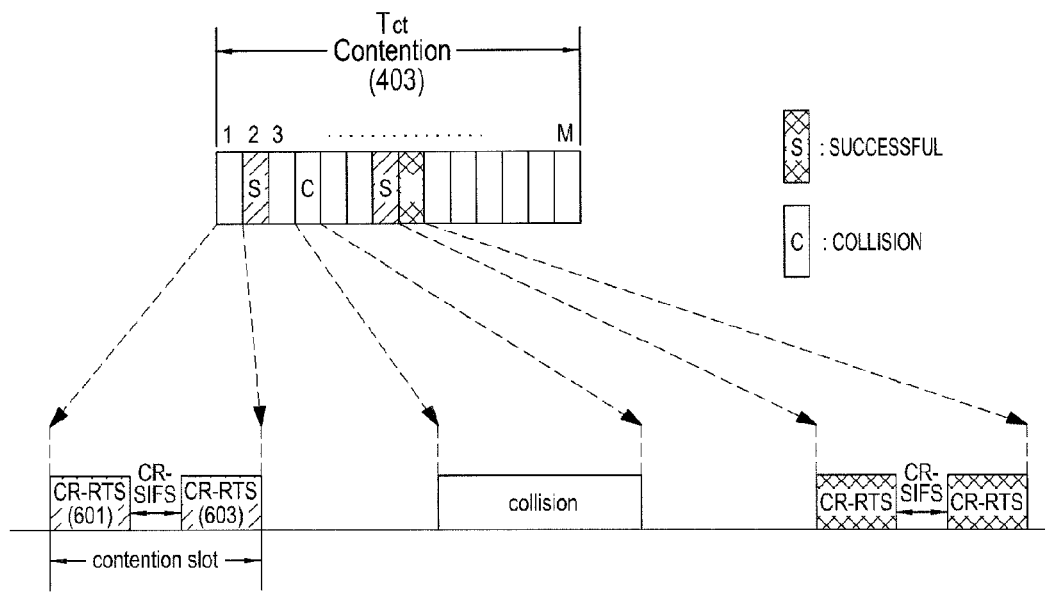
FIG. 6 illustrates a contention interval according to an embodiment of the present disclosure.

FIG. 6 illustrates a contention interval according to an embodiment of the present disclosure.

The contention interval 403 includes M contention slots. A terminal that intends to transmit a signal selects one of the M contention slots randomly and contends with other terminals in the selected slot. If two or more terminals select the same slot, a collision occurs. If one terminal selects a slot without a collision, the terminal is successful. Successful SUs transmit data during a transmission interval on their selected idle channels. If a plurality of SUs are successful, the SUs may transmit signals simultaneously on different channels during the same transmission interval.

Since an idle channel is sensed and it is determined whether to use the idle channel by sensing the channel, channel sensing capability is a significant factor that affects the performance of a CR system. To increase the performance of the CR system, individual SUs should sense as many channels as possible. However, increasing the number of channels to sense increases system complexity and power consumption. Accordingly, the number of sensing channels must be balanced. In this context, the present disclosure restricts the number of channels sensed by a single terminal in order to reduce complexity. Consequently, there is a shortage of idle channels. To overcome the shortage of idle channels, a mechanism of sharing sensed results between terminals is disclosed.

Each SU selects slot i randomly from among N slots and senses channel i in slot i and broadcasts the sensing result. Each slot is mapped to one channel. A single SU may sense a plurality of channels.

The SU may broadcast a sensed result in the following manner. One SS slot includes N slots, each slot being divided into three subslots. An SU senses a channel in the first slot, and broadcasts a sensed result in a tone signal in the second and third slots. If the tone signal is set to '10', the tone signal indicates an idle state. If the tone signal is set to '11', the tone signal indicates a busy state. If the tone signal is set to '00', the tone signal indicates the channel is not sensed.

The present disclosure provides two channel sensing methods, FSC and ACS.

In FCS, one SU senses $Ch_{max}$ channels randomly selected from N channels. Therefore, the number of channels to be sensed is preset. On the other hand, the number of channels to be sensed varies from one to $Ch_{max}$ according to the traffic load of Primary Users (PUs) in ACS. The number $Ch_{idle}$ of required idle channels is defined in ACS. A terminal senses one to $Ch_{max}$ channels until the number of sensed idle channels reaches $Ch_{idle}$. That is, channel sensing stops when the number of sensed idle channels reaches $Ch_{idle}$ and otherwise, $Ch_{max}$ channels are sensed.

FCS is a simpler sensing algorithm than ACS in that all terminals sense $Ch_{max}$ channels. However, because the number of sensed channels increases with a lower traffic load of PUs, FCS consumes as much power. On the other hand, ACS is more efficient than FCS because the number of channels to be sensed is determined adaptively according to the traffic situation of PUs.

After channel sensing, a contention interval starts. Each SU selects one of M contention slots randomly during the contention period and transmits and receives a Cognitive Radio-Request To Send (CR-RTS) message 601 and a Cognitive Radio-Clear To Send (CR-CTS) message 603. After transmitting the CR-RTS message 601 in the selected slot, the SU awaits reception of the CR-RTS message 603. Upon reception of the CR-RTS message, the SU determines that it has succeeded in a contention. If the SU fails to receive the CR-RTS message, the SU determines that it has failed in the contention. If two or more SUs select the same contention slot and transmit CR-RTS messages in the contention slot, a collision occurs. Thus, the destination SUs cannot receive the CR-RTS messages and thus cannot respond to the CR-RTS messages. Therefore, an SU that has transmitted a CR-RTS message determines contention success or failure according to whether a CR-RTS message is received.

Figure 7:
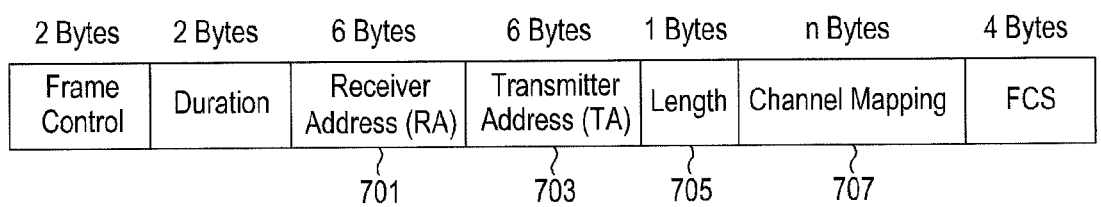
FIG. 7 illustrates a format of Cognitive Radio-Request To Send (CR-RTS) and Cognitive Radio-Clear To Send (CR-CTS) messages according to an embodiment of the present disclosure.

FIG. 7 illustrates a format of CR-RTS and CR-CTS messages according to an embodiment of the present disclosure.

Referring to FIG. 7, a CR-RTS frame includes a Transmission Address (TA) 703 set to the address of a source terminal, a Receiver Address (RA) 701 set to the address of a destination terminal, and a Channel Mapping 707 indicating available channels. That is, the Channel Mapping field 707 provides a list of idle channels. The Channel Mapping field 707 has a variable length indicated by the Length field 705. For example, if there are N channels, the length of the Channel Mapping field 707 is N bits. A source SU requests at least $Ch_{idle}$ sensed idle channels to a destination SU by a CR-RTS message. If the requested idle channels are available, the destination SU replies to the source SU by a CR-CTS message. Since all SUs participating in contention may overhear CR-RTS and CR-CTS messages from successful SUs, the successful SUs may be scheduled to transmit data without overlapped channels.

FIG. 8 illustrates a SMC-MAC protocol algorithm according to an embodiment of the present disclosure.

Referring to FIG. 8, an operation of the protocol according to the embodiment of the present disclosure will be described with reference to FIG. 4 in which SU1, SU2, SU3, SU4 and SU5 are configured to transmit data on unused channels. SU1 senses channels 1 and 3, SU2 senses channel i, SU3 senses channel j and channel N, and SU4 and SU5 sense no idle channels. Each SU broadcasts their respective sensing result. When an SS interval ends, every SU shares information about channels 1, 3, i, j, and N. Then each SU selects one of M contention slots randomly and contends in the selected slot. In the illustrated case, SU1, SU2 and SU4 have succeeded in contention, whereas SU3 and SU5 have selected the same slot and thus failed in contention due to a collision. Therefore, SU1, SU2 and SU4 may transmit signals simultaneously during a transmission interval.

The present disclosure offers the following effects.

Firstly, channel sensing can be performed efficiently with less power consumption in a simpler manner than the conventional channel sensing. Conventionally, SUs sense all channels or store previous sensed values and use them. In the present disclosure, FCS and ACS are provided as channel sensing methods. Every SU selects and senses $Ch_{max}$ channels and shares a sensed result with other SUs in FCS. When the traffic load of PUs is low, FCS consumes more power by sensing more channels. On the other hand, the number of channels to be sensed is preset according to the traffic load of PUs in ACS according to the present disclosure. Hence, if the traffic load is lower, fewer channels are sensed and if the traffic load is higher, more channels are sensed.

Figure 9:
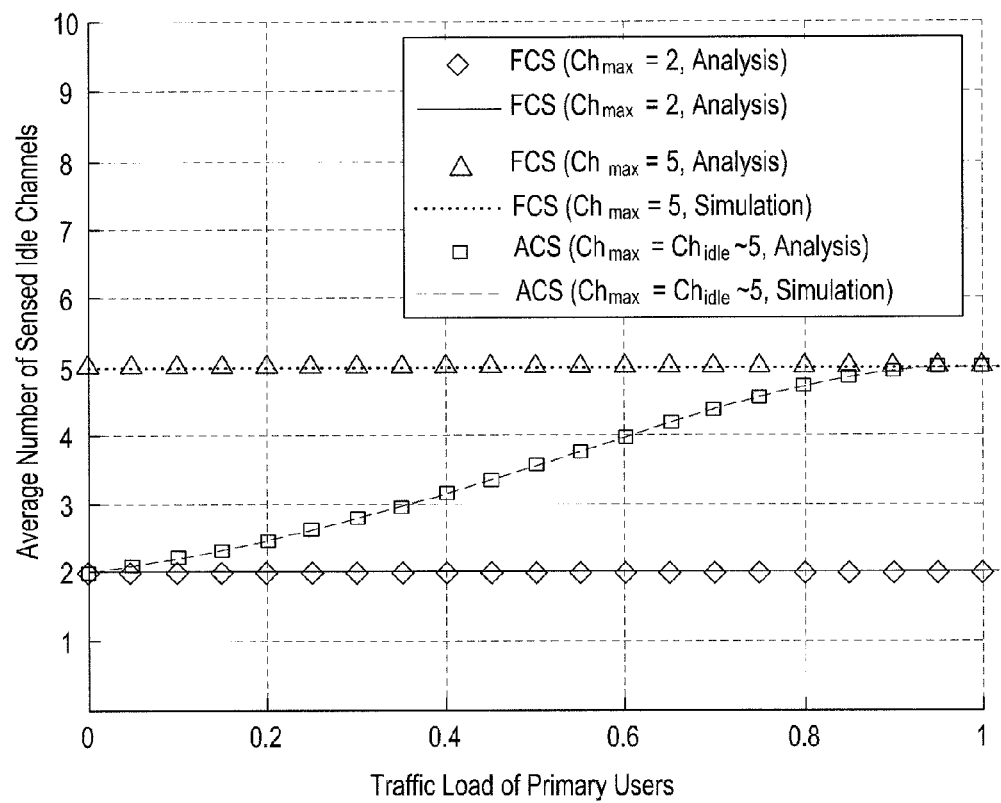
FIG. 9 illustrates an average number of sensed channels versus Primary User (PU) traffic loads according to an embodiment of the present disclosure.

FIG. 9 illustrates an average number of sensed channels versus PU traffic loads according to an embodiment of the present disclosure.

Referring to FIG. 9, the number of channels to be sensed is fixed and thus the same number of channels is sensed irrespective of traffic loads in FCS. On the contrary, since the number of channels to be sensed is determined adaptively according to the traffic load of PUs, more channels are sensed if the traffic load of PUs increases in ACS.

Secondly, the present disclosure enables self-scheduling. In the conventional technology, only a pair of SUs successful in contention from among SUs that want transmission can transmit and receive signals. However, as transmission is possible on multiple channels, one SU cannot use all channels. In contrast, the self-scheduling method of the present disclosure enables scheduling such that one or more SUs can transmit data on different channels.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A self-scheduling method in a Cognitive Radio (CR) system, the method comprising:
   transmitting data on different channels during the same transmission interval of one frame by one or more secondary users,
   wherein the frame includes an idle interval, a sensing and sharing interval, a slotwise contention interval, and the transmission interval,
   wherein the number of channels is equal to the number of slots, and
   wherein, during the sensing and sharing interval, the secondary users sense channels of primary users and share the sensed results.

2. The method according to claim 1, wherein each of the secondary users senses a channel in a first subslot of a slot corresponding to one channel and broadcasts a sensed result to other secondary users in a second subslot and a third subslot of the slot during the sensing and sharing interval.

3. The method according to claim 1, wherein each of the secondary users senses a predetermined number of channels during the sensing sharing interval by a Fixed Channel Sensing (FCS) scheme.

4. The method according to claim 1, wherein each of the secondary users senses a number of channels according to a primary user traffic load during the sensing and sharing interval by an Adaptive Channel Sensing (ACS) scheme.

5. The method according to claim 1, wherein, during the contention interval, a secondary user transmits channel state information of a sensed idle channel to a destination secondary user by a Cognitive Radio-Request To Send (CR-RTS) message and determines whether the requested idle channel is available according to a Cognitive Radio-Clear To Send (CR-CRTS) message that is received from the destination secondary user.

6. The method according to claim 5, wherein, if the secondary users receive CR-CTS messages successfully during the contention interval, the secondary users transmit data simultaneously on different channels during the transmission interval.

7. The method according to claim 5, wherein each of the CR-RTS message and the CR-CTS message includes a channel mapping field indicating a list of idle channels and a length field indicating the length of the channel mapping field.

8. A self-scheduling apparatus in a Cognitive Radio (CR) system, the apparatus comprising:
   a transmitter configured to enable one or more secondary users to transmit data on different channels during the same transmission interval of one frame,
   wherein the frame includes an idle interval, a sensing and sharing interval, a slotwise contention interval, and the transmission interval,
   wherein the number of channels is equal to the number of slots, and
   wherein, during the sensing and sharing interval, the secondary users sense channels of primary users and share the sensed results.

9. The apparatus according to claim 8, wherein each of the secondary users senses a channel in a first subslot of a slot corresponding to one channel and broadcasts a sensed result to other secondary users in a second subslot and a third subslot of the slot during the sensing and sharing interval.

10. The apparatus according to claim 8, wherein each of the secondary users senses a predetermined number of channels during the sensing and sharing interval by a Fixed Channel Sensing (FCS) scheme.

11. The apparatus according to claim 8, wherein each of the secondary users senses a number of channels according to a primary user traffic load during the sensing and sharing interval by an Adaptive Channel Sensing (ACS) scheme.

12. The apparatus according to claim 8, wherein, during the contention interval, a secondary user transmits channel state information of a sensed idle channel to a destination secondary user by a Cognitive Radio-Request To Send (CR-RTS) message and determines whether the requested idle channel is available according to a Cognitive Radio-Clear To Send (CR-CRTS) message that is received from the destination secondary user.

13. The apparatus according to claim 12, wherein, if the secondary users receive CR-CTS messages successfully during the contention interval, the secondary users can transmit data simultaneously on different channels during the transmission interval.

14. The apparatus according to claim 12, wherein each of the CR-RTS message and the CR-CTS message includes a channel mapping field indicating a list of idle channels and a length field indicating the length of the channel mapping field.

15. At least one non-transitory processor readable medium for storing a computer program of instructions configured to be readable by at least one processor for instructing the at least one processor to execute a computer process for performing the method as recited in claim 1.

* * * * *